(12) United States Patent
Choi

(10) Patent No.: US 9,604,529 B2
(45) Date of Patent: Mar. 28, 2017

(54) FOUR WHEEL DRIVE POWER TRANSMISSION SYSTEM OF HYBRID ELECTRIC VEHICLE

(71) Applicant: Hyundai Motor Company, Seoul (KR)

(72) Inventor: Kum Lim Choi, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/943,546

(22) Filed: Nov. 17, 2015

(65) Prior Publication Data

US 2016/0375756 A1    Dec. 29, 2016

(30) Foreign Application Priority Data

Jun. 29, 2015    (KR) .................. 10-2015-0092454

(51) Int. Cl.
| | |
|---|---|
| *B60K 17/356* | (2006.01) |
| *B60K 6/52* | (2007.10) |
| *F16H 3/72* | (2006.01) |
| *F16H 37/08* | (2006.01) |
| *B60K 17/354* | (2006.01) |
| *B60K 6/365* | (2007.10) |

(52) U.S. Cl.
CPC .............. *B60K 6/52* (2013.01); *B60K 6/365* (2013.01); *B60K 17/354* (2013.01); *B60K 17/356* (2013.01); *F16H 3/728* (2013.01); *F16H 37/0806* (2013.01); *B60Y 2200/92* (2013.01); *B60Y 2400/73* (2013.01); *B60Y 2400/80* (2013.01); *Y10S 903/911* (2013.01); *Y10S 903/916* (2013.01)

(58) Field of Classification Search
None
See application file for complete search history.

(56) References Cited

U.S. PATENT DOCUMENTS

| | | | | |
|---|---|---|---|---|
| 6,449,552 B2 * | 9/2002 | Ohba | ....... | B60K 6/44 701/69 |
| 6,524,217 B1 * | 2/2003 | Murakami | ....... | B60K 6/365 180/65.225 |
| 6,549,840 B1 * | 4/2003 | Mikami | ....... | B60K 6/365 180/243 |
| 6,595,308 B2 * | 7/2003 | Bowen | ....... | B60K 1/00 180/65.235 |
| 6,615,940 B2 * | 9/2003 | Morisawa | ....... | B60K 6/46 180/165 |
| 6,691,809 B2 * | 2/2004 | Hata | ....... | B60K 6/44 180/65.225 |
| 7,163,480 B2 * | 1/2007 | Supina | ....... | B60K 6/40 475/5 |

(Continued)

FOREIGN PATENT DOCUMENTS

| | | |
|---|---|---|
| JP | 11-208304 A | 8/1999 |
| JP | 2004-168690 A | 6/2004 |

(Continued)

*Primary Examiner* — Dirk Wright
(74) *Attorney, Agent, or Firm* — Morgan, Lewis & Bockius LLP

(57) ABSTRACT

A four wheel drive power transmission system may include: a front wheel drive unit configured to selectively transmit power of an engine and power of a first motor/generator to a front wheel differential apparatus; and a rear wheel drive unit configured to transmit power of a second motor/generator to a rear wheel reduction gear unit.

14 Claims, 7 Drawing Sheets

(56) References Cited

U.S. PATENT DOCUMENTS

| | | | | |
|---|---|---|---|---|
| 7,174,979 B2* | 2/2007 | Ohta | ............... | B60K 6/365 180/65.25 |
| 7,268,451 B2* | 9/2007 | Hertz | ............... | F16H 57/04 290/40 C |
| 7,395,889 B2* | 7/2008 | Sugiyama | ............... | B60K 6/365 180/243 |
| 8,061,464 B2* | 11/2011 | Boesch | ............... | B60K 6/365 180/197 |
| 8,556,760 B2* | 10/2013 | Mack | ............... | B60K 1/00 475/152 |
| 8,979,694 B2* | 3/2015 | Holmes | ............... | B60W 20/40 475/5 |
| 2016/0101680 A1* | 4/2016 | Ahn | ............... | B60K 6/365 475/5 |

FOREIGN PATENT DOCUMENTS

| | | |
|---|---|---|
| JP | 2004-331058 A | 11/2004 |
| JP | 2006-027383 A | 2/2006 |
| JP | 2011-098663 A | 5/2011 |
| KR | 10-2011-0006907 A | 1/2011 |
| KR | 10-1459474 B1 | 11/2014 |

* cited by examiner

FIG. 2

| mode | | CL1 | CL2 | CL3 |
|---|---|:---:|:---:|:---:|
| EV mode | | ● | | |
| engine starting and continuous mode | | | ● | |
| parallel mode | first fixed speed | ● | ● | |
| | second fixed speed | | ● | ● |
| power split mode | | | | ● |

FOUR WHEEL DRIVE POWER TRANSMISSION SYSTEM OF HYBRID ELECTRIC VEHICLE

CROSS-REFERENCE TO RELATED APPLICATION

The present application claims priority to and the benefit of Korean Patent Application No. 10-2015-0092454 filed on Jun. 29, 2015, the entire contents of which is incorporated herein for all purposes by this reference.

BACKGROUND OF THE INVENTION

Field of the Invention

The present invention relates to a four wheel drive power transmission system of a hybrid electric vehicle. More particularly, the present invention relates to a four wheel drive power transmission system of a hybrid electric vehicle capable of maximizing improvement of fuel efficiency by performing driving of a power split mode having better low-speed driving efficiency and a parallel mode having better high-speed driving efficiency.

Description of Related Art

Generally, a hybrid vehicle is a vehicle which uses two different power sources efficiently.

Such a hybrid electric vehicle typically uses an engine and a motor/generator. The hybrid electric vehicle uses the motor/generator having relatively better low-speed torque characteristics as a main power source at a low-speed and uses an engine having relatively better high-speed torque characteristics as a main power source at a high-speed.

Since the hybrid electric vehicle stops operation of the engine using the fossil fuel and uses the motor/generator at a low-speed region, fuel consumption may be improved and exhaust gas may be reduced.

The power transmission system of a hybrid electric vehicle is classified into a single-mode type and a multi-mode type.

A torque delivery apparatus such as clutches and brakes for shift control is not necessary, but fuel consumption is high due to deterioration of efficiency at a high-speed region and an additional torque multiplication device is required for being applied to a large vehicle according to the single-mode type.

Since the multi-mode type has high efficiency at the high-speed region and is able to multiply torque autonomously, the multi-mode type can be applied to a full size vehicle.

Therefore, the multi-mode type instead of the single-mode type is applied as the power transmission system of a hybrid electric vehicle and is also under continuous investigation.

The power transmission system of the multi-mode type includes a plurality of planetary gear sets, a plurality of motor/generators operated as a motor and/or a generator, a plurality of torque delivery apparatus (e.g., friction elements, synchronizer and so on) controlling rotation elements of the planetary gear sets, and a battery used as a power source of the motor/generators.

The power transmission system of the multi-mode type has different operating mechanisms depend on connections of the planetary gear sets, the motor/generators, and the torque delivery apparatus.

In addition, the power transmission system of the multi-mode type has different features such a durability, power delivery efficiency, and size depend on the connections of the planetary gear sets, the motor/generators, and the torque delivery apparatus. Therefore, designs for the connection structure of the power transmission system of a hybrid electric vehicle are also under continuous investigation to achieve robust and compact power transmission system having no power loss.

The hybrid electric vehicle may be classified into a two wheel drive (hereinafter, referred to as 2WD) type and a four wheel drive (hereinafter, referred to as 4WD) type depending on a driving type.

The 2WD hybrid electric vehicle is generally configured to drive a front wheel using two motors/generators and a planetary gear set.

The 4WD hybrid electric vehicle is configured to drive the front wheel using the two motors/generators and the planetary gear set and is configured to drive a rear wheel using one motor/generator.

However, the 4WD hybrid electric vehicle uses the two motors/generators and the planetary gear set to drive the front wheel to convert a part of the power of the engine into electrical energy at all times, such that fuel efficiency may be reduced in a high-speed region.

Therefore, in order to supplement the above problem, there is a need to increase the number of planetary gear sets and the number of clutches and brakes, which may lead to reduced power transmission efficiency and increased production cost.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a four wheel drive power transmission system of a hybrid electric vehicle having advantages of saving production cost by using motor/generators less by one than in the related art.

Further, various aspects of the present invention are directed to providing a four wheel drive power transmission system of a hybrid electric vehicle having advantages of maximizing improvement of fuel efficiency by performing driving of a power split mode having better low-speed driving efficiency and a parallel mode and a continuous mode having better high-speed driving efficiency.

Further, various aspects of the present invention are directed to providing a four wheel drive power transmission system of a hybrid electric vehicle having further advantages of saving production cost by reducing a capacity of a motor/generator for generating electric energy by using a power split mode.

A four wheel drive power transmission system of a hybrid electric vehicle according to an exemplary embodiment of the present invention may include: a first input shaft directly and operably connected to an engine; a second input shaft disposed coaxially with the first input shaft; a first motor/generator operable as a motor or a generator and directly and operably connected to the second input shaft; a second motor/generator operable as a motor or a generator and disposed in a rear wheel side transmission housing; a planetary gear set disposed between the first and second input shafts, and including a first rotation element directly connected to the second input shaft, a second rotation element directly connected to the first input shaft, and a third rotation element selectively connected to the first input shaft; a power delivery unit including a first front wheel output gear selectively connected to the second input shaft and a second front wheel output gear selectively connected to the third rotation element of the planetary gear set, and selectively receiving power of the engine or power of the first motor/generator; a front wheel reduction gear unit changing power of the power delivery unit and transmitting the changed power to a front wheel differential apparatus; and a rear wheel reduction gear unit changing power of the second motor/generator and transmitting the changed power to a rear wheel differential apparatus.

The planetary gear set may be a single pinion planetary gear set and may include a sun gear being the first rotation element, a planet carrier being the second rotation element, and a ring gear being the third rotation element.

The power transmission system may further include: a first clutch disposed between the second input shaft and the first front wheel output gear; a second clutch disposed between the first input shaft and the third rotation element of the planetary gear set; and a third clutch disposed between the third rotation element of the planetary gear set and the second front wheel output gear.

The front wheel reduction gear unit may include: a front wheel intermediate shaft disposed in parallel with the first and second input shafts; a first front wheel intermediate gear fixedly disposed on the front wheel intermediate shaft and engaged with the first front wheel output gear; a second front wheel intermediate gear fixedly disposed on the front wheel intermediate shaft and engaged with the second front wheel output gear; and a front wheel final output gear fixedly disposed on the front wheel intermediate shaft and engaged with a front wheel final reduction gear of the front wheel differential apparatus so as to transmit power of the front wheel intermediate shaft to the front wheel differential apparatus.

The rear wheel reduction gear unit may include: a rotor shaft directly and operably connected to the second motor/generator; and a rear wheel output gear fixedly disposed on the rotor shaft and engaged with a rear wheel final reduction gear of the rear wheel differential apparatus so as to transmit power of the rotor shaft to the rear wheel differential apparatus.

A four wheel drive power transmission system of a hybrid electric vehicle according to another exemplary embodiment of the present invention may include: a first input shaft directly and operably connected to an engine; a second input shaft disposed coaxially with the first input shaft; a first motor/generator operable as a motor or a generator and directly and operably connected to the second input shaft; a second motor/generator operable as a motor or a generator and disposed in a rear wheel side transmission housing; a planetary gear set disposed between the first and second input shafts and including a sun gear directly connected to the second input shaft, a planet carrier directly connected to the first input shaft, and a ring gear selectively connected to the first input shaft; a power delivery unit including a first front wheel output gear selectively connected to the second input shaft and a second front wheel output gear selectively connected to the ring gear of the planetary gear set, and selectively receiving power of the engine or power of the first motor/generator; a front wheel reduction gear unit changing power of the power delivery unit and transmitting the changed power to a front wheel differential apparatus; and a rear wheel reduction gear unit changing power of the second motor/generator and transmitting the changed power to a rear wheel differential apparatus.

The power transmission system may further include: a first clutch disposed between the second input shaft and the first front wheel output gear; a second clutch disposed between the first input shaft and the ring gear of the planetary gear set; and a third clutch disposed between the ring gear of the planetary gear set and the second front wheel output gear.

The front wheel reduction gear unit may include: a front wheel intermediate shaft disposed in parallel with the first and second input shafts; a first front wheel intermediate gear fixedly disposed on the front wheel intermediate shaft and engaged with the first front wheel output gear; a second front wheel intermediate gear fixedly disposed on the front wheel intermediate shaft and engaged with the second front wheel output gear; and a front wheel final output gear fixedly disposed on the front wheel intermediate shaft and engaged with a front wheel final reduction gear of the front wheel differential apparatus so as to transmit power of the front wheel intermediate shaft to the front wheel differential apparatus.

The rear wheel reduction gear unit may include: a rotor shaft directly and operably connected to the second motor/generator; and a rear wheel output gear fixedly disposed on the rotor shaft and engaged with a rear wheel final reduction gear of the rear wheel differential apparatus so as to transmit power of the rotor shaft to the rear wheel differential apparatus.

A four wheel drive power transmission system of a hybrid electric vehicle according other exemplary embodiment of the present invention may include: a front wheel drive unit configured to selectively transmit power of an engine and power of a first motor/generator to a front wheel differential apparatus; and a rear wheel drive unit configured to transmit power of a second motor/generator to a rear wheel differential apparatus, wherein the front wheel drive unit includes a planetary gear set disposed between the engine and the first motor/generator, and a front wheel reduction gear unit selectively receiving the power of the engine or the power of the first motor/generator, the planetary gear set includes a first rotation element directly connected to the first motor/generator, a second rotation element directly connected to the engine, and a third rotation element selectively connected to the engine, and the front wheel reduction gear unit is selectively connected to the first rotation element or the third rotation element.

The front wheel reduction gear unit may include a front wheel intermediate shaft and first and second front wheel intermediate gears and a front wheel final output gear fixedly disposed on the front wheel intermediate shaft, wherein the first front wheel intermediate gear is selectively connected to the first rotation element, the second front wheel intermediate gear is selectively connected to the third rotation element, and the front wheel final output gear is operably connected to the front wheel differential apparatus.

The power transmission system may further include: a first front wheel output gear engaged with the first front wheel intermediate gear; a second front wheel output gear engaged with the second front wheel intermediate gear; a first clutch selectively connecting the first rotation element with the first front wheel output gear; a second clutch selectively connecting the second rotation element with the third rotation element; and a third clutch selectively connecting the third rotation element with the second front wheel output gear.

The rear wheel drive unit may include a rear wheel reduction gear unit which changes the power of the second motor/generator and transmits the changed power to the rear wheel differential apparatus.

The rear wheel reduction gear unit may include: a rotor shaft directly and operably connected to the second motor/generator; and a rear wheel output gear fixedly disposed on the rotor shaft and engaged with a rear wheel final reduction gear of the rear wheel differential apparatus so as to transmit power of the rotor shaft to the rear wheel differential apparatus.

A four wheel drive power transmission system of a hybrid electric vehicle according to an exemplary embodiment of the present invention uses the motor/generators less by one than the power transmission system according to the related art, thereby reducing the production cost.

Further, it is possible to maximize the improvement of fuel efficiency by performing the driving of the power split mode having the better low-speed driving efficiency and the parallel mode and the continuous mode having the better high-speed driving efficiency.

Further, it is possible to reduce the capacity of the motor/generator for generating electric energy by implementing the power split mode, thereby saving the production cost.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operational chart of friction elements at each mode applied to a four wheel drive power transmission system of a hybrid electric vehicle according to an exemplary embodiment of the present invention.

Figure 1:
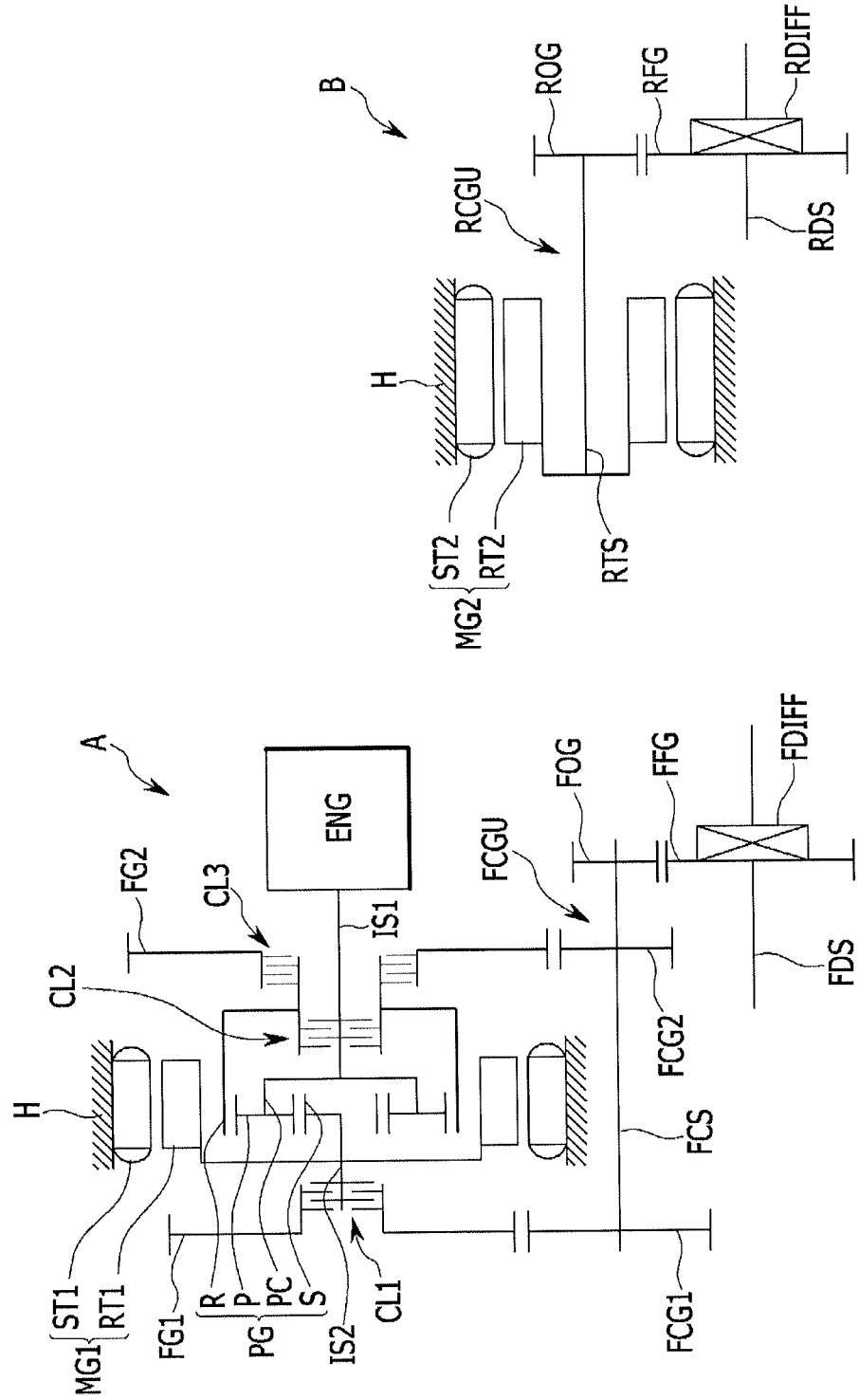
FIG. 1 is a schematic diagram of a four wheel drive power transmission system of a hybrid electric vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

Description of components that are not necessary for explaining the present exemplary embodiments will be omitted, and the same constituent elements are denoted by the same reference numerals in this specification.

In the detailed description, ordinal numbers are used for distinguishing constituent elements having the same terms, and have no specific meanings.

FIG. 1 is a schematic diagram of a four wheel drive power transmission system of a hybrid electric vehicle according to an exemplary embodiment of the present invention.

Referring to FIG. 1, a four wheel drive power transmission system of a hybrid electric vehicle according to an exemplary embodiment of the present invention includes a front wheel drive unit A and a rear wheel drive unit B.

The front wheel drive unit A includes first and second input shafts IS1 and IS2 that are input means, a first motor/generator MG1, a planetary gear set PG, first and second front wheel output gears FG1 and FG2 that are power delivery units, first, second, and third clutches CL1, CL2, and CL3 that are variable connection means, and a front wheel reduction gear unit FCGU.

The first input shaft IS1 is connected to an output side of an engine ENG so as to receive power of the engine ENG, and the second input shaft IS2 is disposed at the rear of and coaxially with the first input shaft IS1 and is connected to the first motor/generator MG1 so as to receive power of the first motor/generator MG1.

A torsion damper or a torque converter for reducing or absorbing torsional vibration or increasing torque may be disposed between the output side of the engine ENG and the first input shaft IS1.

The first motor/generator MG1 is an independent power source, is disposed on the second input shaft IS2, and is operable as a motor or a generator.

In addition, the first motor/generator MG1 includes a first rotor RT1 and a first stator ST1, the first rotor RT1 is directly connected to the second input shaft IS2, and the first stator ST1 is directly fixed to a housing H.

The planetary gear set PG is a single pinion planetary gear set and includes a sun gear S, a planet carrier PC rotatably supporting a pinion P externally meshing with the sun gear S, and a ring gear R internally meshing with the pinion P as first, second, and third rotation elements.

The sun gear S is directly connected to the second input shaft IS2, the planet carrier PC is directly connected to the first input shaft IS1, and the ring gear R is selectively connected to the first input shaft IS1.

The power delivery unit includes the first front wheel output gear FG1 and the second front wheel output gear FG2. The first front wheel output gear FG1 is disposed on the second input shaft IS2 and is selectively connected to the second input shaft IS2, and the second front wheel output gear FG2 is disposed on the first input shaft IS1 and is selectively connected to the ring gear R of the planetary gear set PG.

The variable connection device includes the first, second, and third clutches CL1, CL2, and CL3.

The first clutch CL1 is disposed between the second input shaft IS2 and the first front wheel output gear FG1, the second clutch CL2 is disposed between the first input shaft IS1 and the ring gear R, and the third clutch CL3 is disposed between the ring gear R and the second front wheel output gear FG2.

The first clutch CL1 selectively transmits power of the first motor/generator MG1 to the first front wheel output gear FG1 or selectively transmits power of the engine ENG transmitted from the first input shaft IS1 to the first front wheel output gear FG1.

The second clutch CL2 causes the planetary gear set PG to integrally rotate as one body.

The third clutch CL3 selectively transmits the power of the engine ENG transmitted from the first input shaft IS1 to the second front wheel output gear FG2 or selectively transmits the power of the first motor/generator MG1 transmitted from the second input shaft IS2 to the second front wheel output gear FG2.

The first, second, and third clutches CL1, CL2, and CL3 including the variable connection device may be conventional multi-plate friction elements of wet type that are operated by hydraulic pressure, but are not limited thereto.

The front wheel reduction gear unit FCGU includes a front wheel intermediate shaft FCS disposed between and in parallel with the first and second input shafts IS1 and IS2 and the front wheel differential apparatus FDIFF, a first front wheel intermediate gear FCG1 fixedly disposed on a side portion of the front wheel intermediate shaft FCS and engaged with the first front wheel output gear FG1, a second front wheel intermediate gear FCG2 fixedly disposed on a middle portion of the front wheel intermediate shaft FCS and engaged with the second front wheel output gear FG2, and a front wheel final output gear FOG fixedly disposed on the other side portion of the second front wheel intermediate gear FCG2 and engaged with a front wheel final reduction gear FFG of the front wheel differential apparatus FDIFF.

A gear ratio of the first front wheel output gear FG1 and the first front wheel intermediate gear FCG1 may be different from that of the second front wheel output gear FG2 and the second front wheel intermediate gear FCG2. According to the present exemplary embodiment, it is exemplified that gear ratios are set such that the first front wheel output gear FG1 and the first front wheel intermediate gear FCG1 are used at a low-speed, and the second front wheel output gear FG2 and the second front wheel intermediate gear FCG2 are used at a high-speed.

In addition, the front wheel differential apparatus FDIFF, well known to a person of an ordinary skill in the art, dividedly transmits the decelerated power by gear ratios of the front wheel final output gear FOG and the front wheel final reduction gear FFG to left and right front wheels through a front wheel drive shaft FDS according to road state and running state.

The rear wheel drive unit B includes a second motor/generator MG2 and a rear wheel reduction gear unit RCGU.

The second motor/generator MG2 is an independent power source and is operable as a motor and a generator. In the present exemplary embodiment, the second motor/generator MG2 is mainly used as the generator.

In addition, the second motor/generator MG2 includes a second rotor RT2 and a second stator ST2, the second rotor RT2 is operably connected to a rear wheel differential apparatus RDIFF through the rear wheel reduction gear unit RCGU, and the second stator ST2 is directly fixed to the housing H.

Herein, the rear wheel reduction gear unit RCGU includes a rotor shaft RTS and a rear wheel output gear ROG. The second rotor RT2 of the second motor/generator MG2 is directly connected to a side portion of the rotor shaft RTS and the rear wheel output gear ROG is fixedly disposed on the other side portion of the rotor shaft RTS.

In addition, the rear wheel output gear ROG is engaged with a rear wheel final reduction gear RFG of the rear wheel differential apparatus RDIFF.

The rear wheel differential apparatus RDIFF, well known to a person of an ordinary skill in the art, dividedly transmits the decelerated power by gear ratios of the rear wheel output gear ROG and the rear wheel final reduction gear RFG to left and right rear wheels through a rear wheel drive shaft RDS according to the road state and the running state.

FIG. 2 is an operational chart of friction elements at each mode applied to a four wheel drive power transmission system of a hybrid electric vehicle according to an exemplary embodiment of the present invention.

Referring to FIG. 2, the four wheel drive power transmission system of a hybrid electric vehicle according to the exemplary embodiment of the present invention can achieve an electric vehicle (EV) mode, an engine starting and continuous mode, a parallel mode, and a power split mode.

That is, the first clutch CL1 is operated at the EV mode, the second clutch CL2 is operated at the engine starting and continuous mode, the first and second clutches CL1 and CL2 are operated at a first fixed speed of the parallel mode, the second and third clutches CL2 and CL3 are operated at a second fixed speed of the parallel mode, and the third clutch CL3 is operated at the power split mode.

Hereinafter, referring to FIG. 3 to FIG. 7, flow of power at each mode in the four wheel drive power transmission system of a hybrid electric vehicle according to the exemplary embodiment of the present invention will be described in detail.

Figure 3:
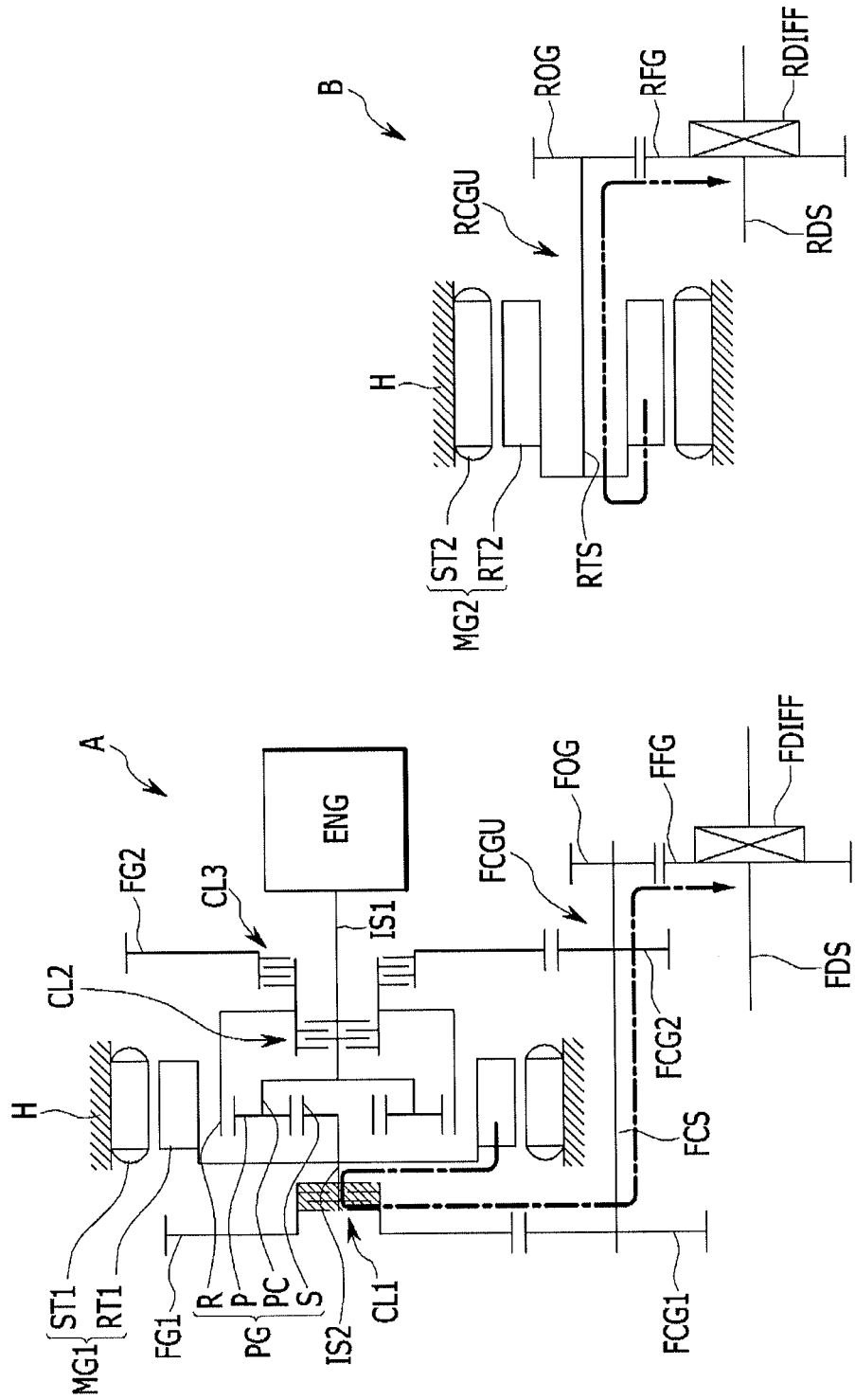
FIG. 3 is a schematic diagram for illustrating flow of power at an electric vehicle (EV) mode in a four wheel drive power transmission system of a hybrid electric vehicle according to an exemplary embodiment of the present invention.

FIG. 3 is a schematic diagram for illustrating flow of power at an electric vehicle (EV) mode in a four wheel drive power transmission system of a hybrid electric vehicle according to an exemplary embodiment of the present invention.

Referring to FIG. 3, the first clutch CL1 is operated at the EV mode.

The engine ENG is stopped and electrically continuously variable shift may be achieved by controlling the power of the second motor/generator MG2 at the EV mode.

That is, the power of the first motor/generator MG1 is transmitted to the second input shaft IS2, the first clutch CL1, the first front wheel output gear FG1, the first front wheel intermediate gear FCG1, the front wheel intermediate shaft FCS, the front wheel final output gear FOG, and the front wheel final reduction gear FFG. In this case, the power transmitted to the front wheel final reduction gear FFG is divided through the front wheel differential apparatus FDIFF according to the road state and the running state, and the divided power is transmitted to the left and right front wheels through the front wheel drive shaft FDS. Therefore, the EV mode is achieved.

At this time, the power of the second motor/generator MG2 may be selectively transmitted to the rear wheels. In addition, the first clutch CL1 may be operated in front wheel regenerative braking.

Figure 4:
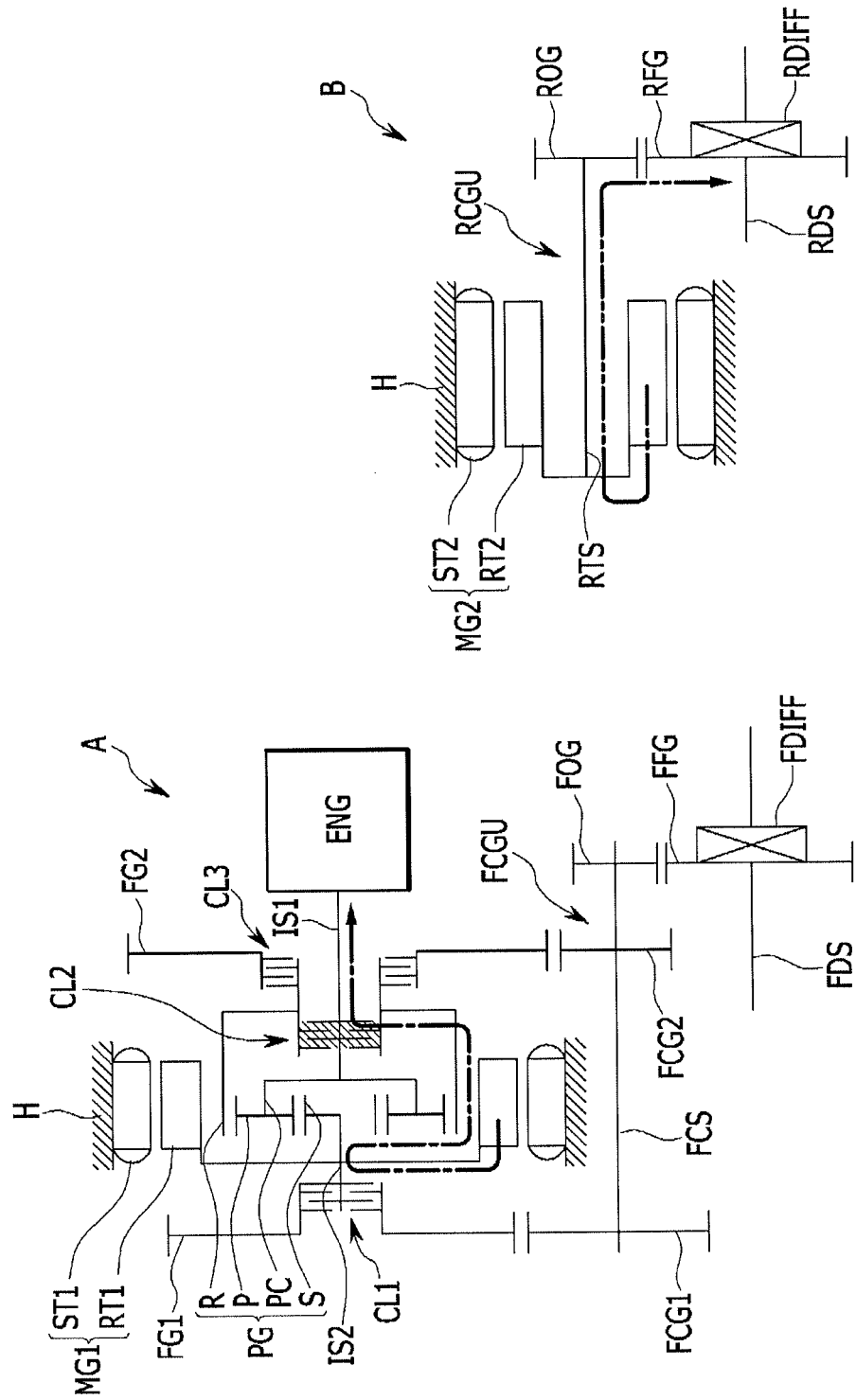
FIG. 4 is a schematic diagram for illustrating flow of power at an engine starting and continuous mode in a four wheel drive power transmission system of a hybrid electric vehicle according to an exemplary embodiment of the present invention.

FIG. 4 is a schematic diagram for illustrating flow of power at an engine starting and continuous mode in a four wheel drive power transmission system of a hybrid electric vehicle according to an exemplary embodiment of the present invention.

Referring to FIG. 4, if vehicle speed increases and is faster than or equal to a predetermined speed at the EV mode, the engine ENG is started. At this time, the second clutch CL2 is operated and the planetary gear set PG rotates integrally. At this state, the power of the first motor/generator MG1 is transmitted to the engine ENG through the planetary gear set PG, the second clutch CL2, and the first input shaft IS1, and causes the engine ENG to be started.

Simultaneously, the power of the second motor/generator MG2 is transmitted to the rear wheels. Therefore, the vehicle runs by rear wheel drive.

After the engine ENG is started, the first motor/generator MG1 generates electric energy and the second motor/generator MG2 is driven by the generated electrical energy.

Figure 5:
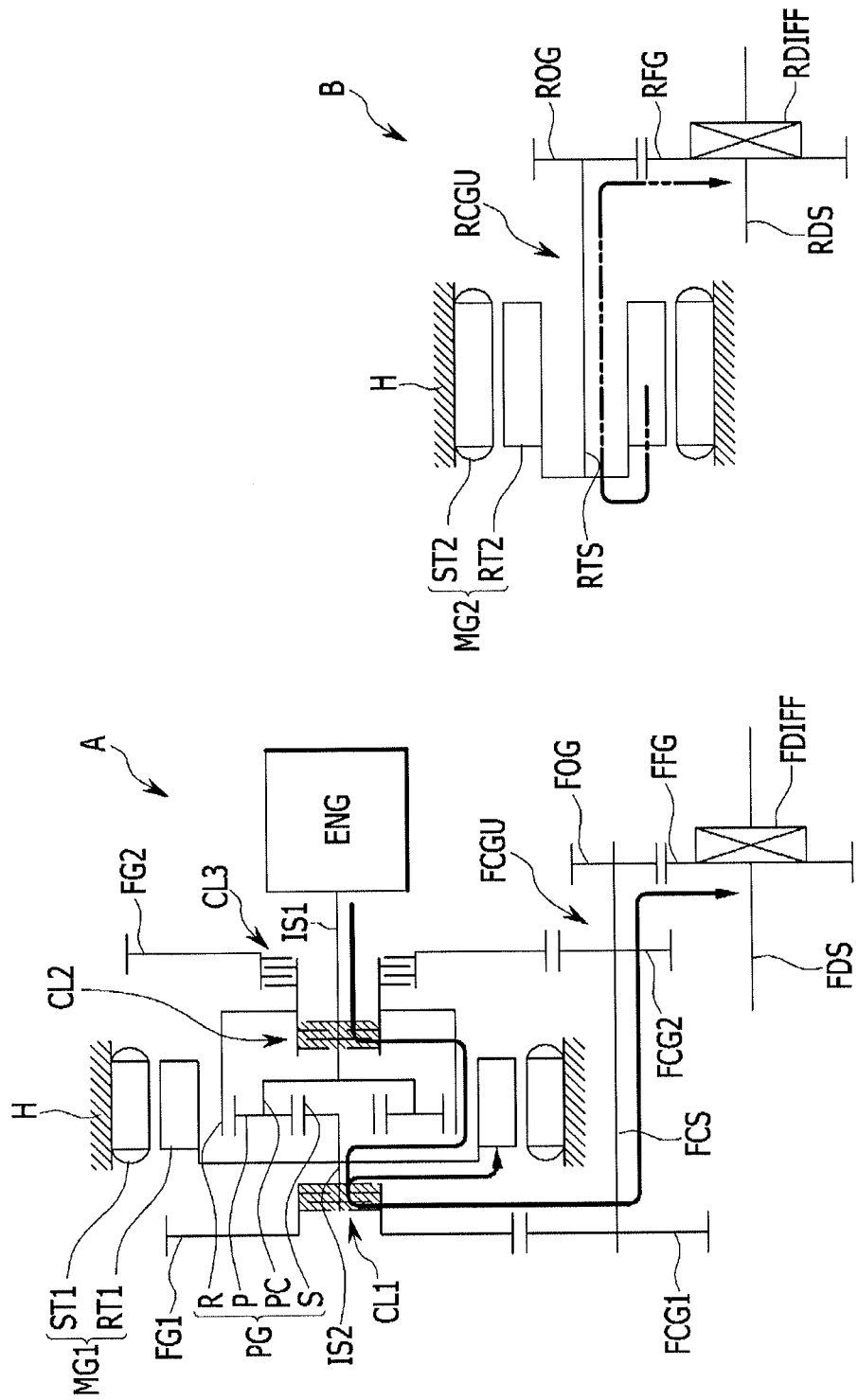
FIG. 5 is a schematic diagram for illustrating flow of power at a first fixed speed of a parallel mode in a four wheel drive power transmission system of a hybrid electric vehicle according to an exemplary embodiment of the present invention.

FIG. 5 is a schematic diagram for illustrating flow of power at a first fixed speed of a parallel mode in a four wheel drive power transmission system of a hybrid electric vehicle according to an exemplary embodiment of the present invention.

Referring to FIG. 5, the first clutch CL1 and the second clutch CL2 are operated at the first fixed speed of the parallel mode.

In a state that the planetary gear set PG rotates integrally by operation of the second clutch CL2, the power of the engine ENG is transmitted to the first input shaft IS1, the second clutch CL2, the planetary gear set PG, the second input shaft IS2, the first clutch CL1, the first front wheel output gear FG1, the first front wheel intermediate gear FCG1, the front wheel intermediate shaft FCS, the front wheel final output gear FOG, and the front wheel final reduction gear FFG. In this case, the power transmitted to the front wheel final reduction gear FFG is divided through the front wheel differential apparatus FDIFF according to the road state and the running state, and the divided power is transmitted to the left and right front wheels through the front wheel drive shaft FDS. Therefore, the first fixed speed of the parallel mode is achieved.

At this time, a part of the power of the engine ENG is transmitted to the first motor/generator MG1 and the first motor/generator MG1 generates electric energy. In addition, the power of the second motor/generator MG2 may be selectively transmitted to the left and right rear wheels.

Figure 6:
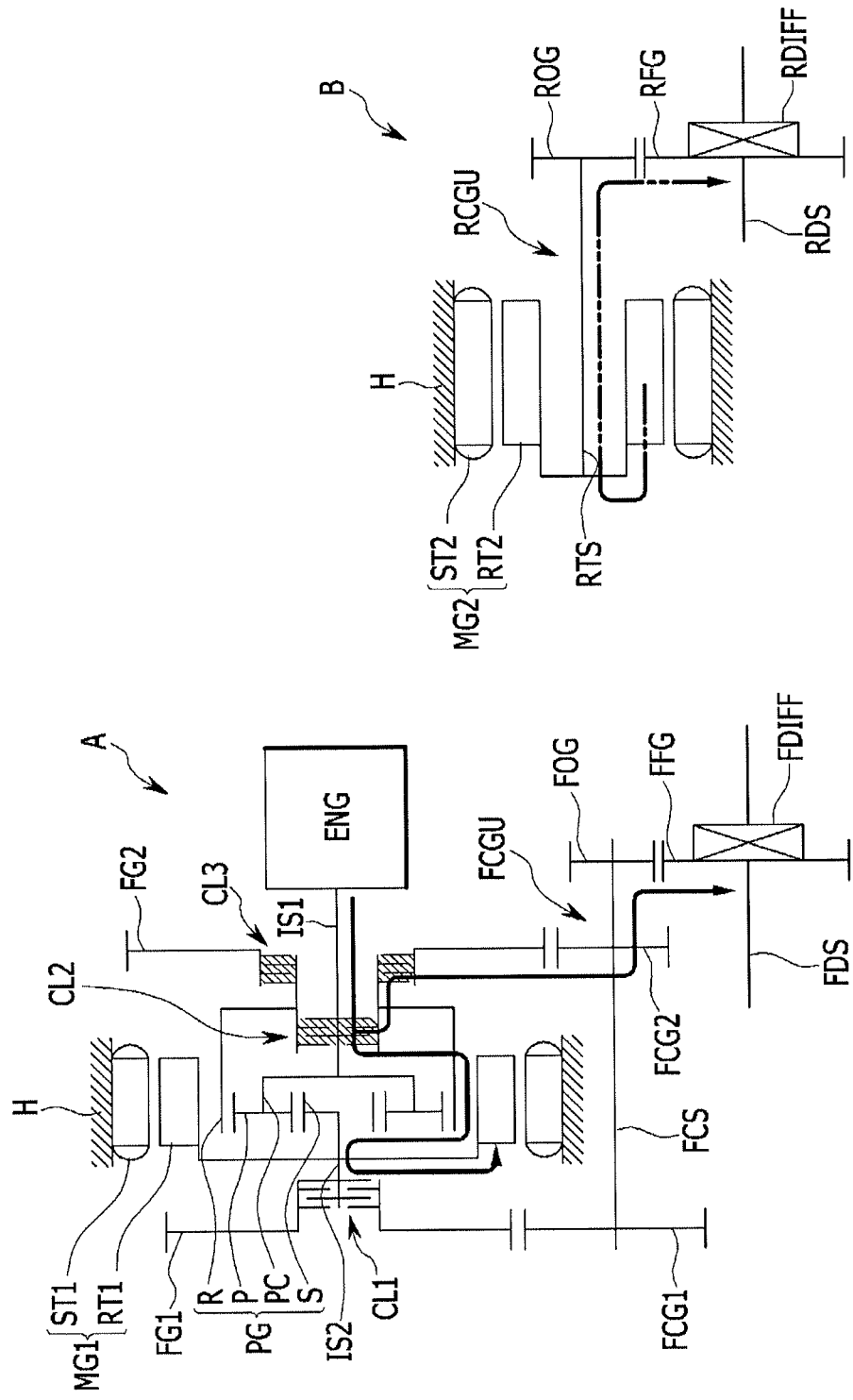
FIG. 6 is a schematic diagram for illustrating flow of power at a second fixed speed of a parallel mode in a four wheel drive power transmission system of a hybrid electric vehicle according to an exemplary embodiment of the present invention.

FIG. 6 is a schematic diagram for illustrating flow of power at a second fixed speed of a parallel mode in a four wheel drive power transmission system of a hybrid electric vehicle according to an exemplary embodiment of the present invention.

Referring to FIG. 6, the second clutch CL2 and the third clutch CL3 are operated at the second fixed speed of the parallel mode.

In a state that the planetary gear set PG rotates integrally by operation of the second clutch CL2, the power of the engine ENG is transmitted to the first input shaft IS1, the second clutch CL2, the planetary gear set PG, the third clutch CL3, the second front wheel output gear FG2, the second front wheel intermediate gear FCG2, the front wheel intermediate shaft FCS, the front wheel final output gear FOG, and the front wheel final reduction gear FFG. In this case, the power transmitted to the front wheel final reduction gear FFG is divided through the front wheel differential apparatus FDIFF according to the road state and the running state, and the divided power is transmitted to the left and right front wheels through the front wheel drive shaft FDS. Therefore, the second fixed speed of the parallel mode is achieved.

At this time, a part of the power of the engine ENG is transmitted to the first motor/generator MG1 and the first motor/generator MG1 generates electric energy. In addition, the power of the second motor/generator MG2 may be selectively transmitted to the left and right rear wheels.

Front wheel and rear wheel regenerative braking may occur at the first fixed speed and the second fixed speed of the parallel mode.

Figure 7:
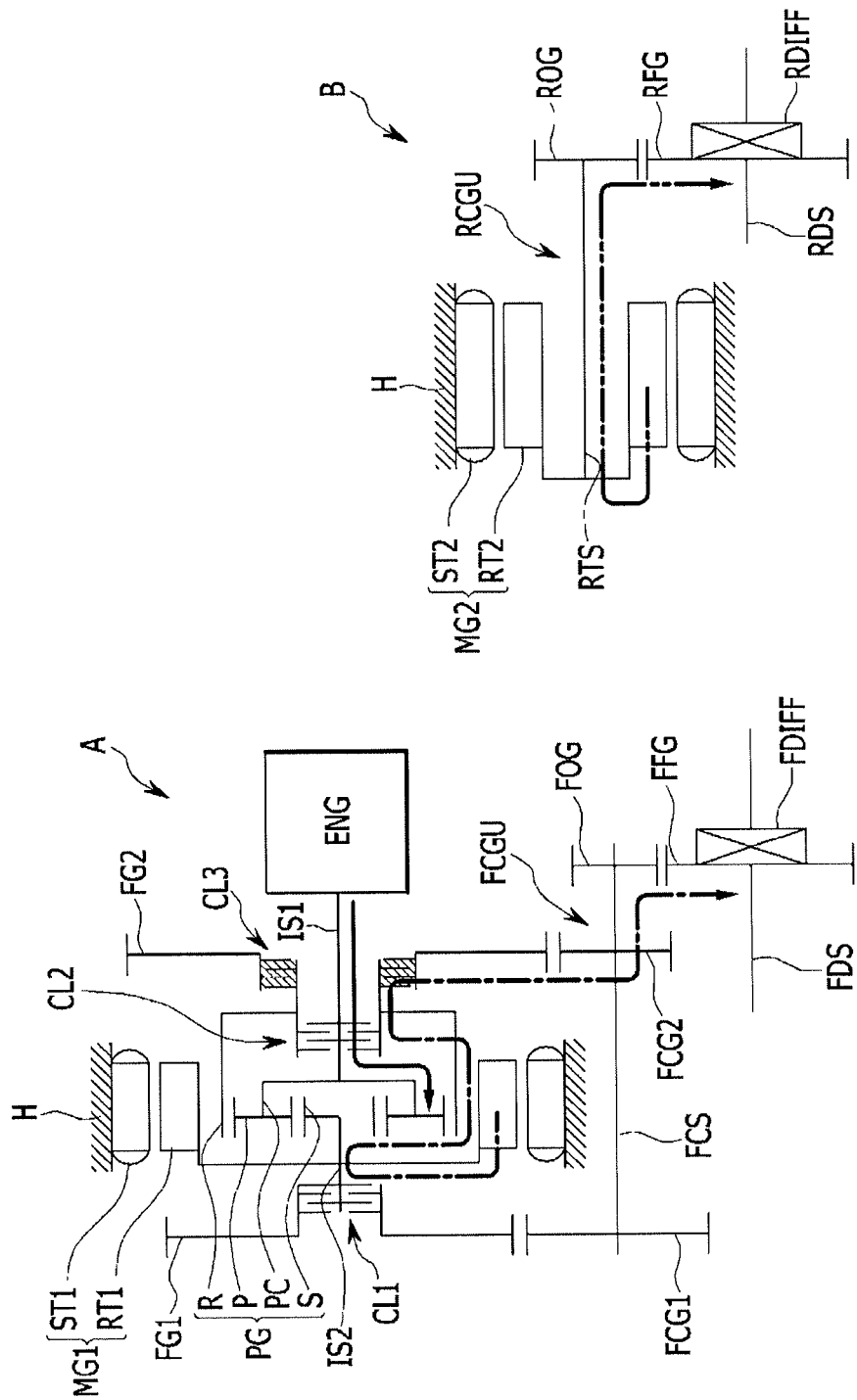
FIG. 7 is a schematic diagram for illustrating flow of power at a power split mode in a four wheel drive power transmission system of a hybrid electric vehicle according to an exemplary embodiment of the present invention.

FIG. 7 is a schematic diagram for illustrating flow of power at a power split mode in a four wheel drive power transmission system of a hybrid electric vehicle according to an exemplary embodiment of the present invention.

Referring to FIG. 7, the third clutch CL3 is operated at the power split mode.

The power of the engine ENG is input to the planetary gear set PG through the first input shaft IS1 and the planet carrier PC, and the power of the first motor/generator MG1 is input to the planetary gear set PG through the second input shaft IS2 and the sun gear S. The power of the engine ENG and the first motor/generator MG1 input to the planetary gear set PG is transmitted to the second front wheel output gear FG2, the second front wheel intermediate gear FCG2, the front wheel intermediate shaft FCS, the front wheel final output gear FOG, and the front wheel final reduction gear FFG. In this case, the power transmitted to the front wheel final reduction gear FFG is divided through the front wheel differential apparatus FDIFF according to the road state and the running state, and the divided power is transmitted to the left and right front wheels through the front wheel drive shaft FDS. Therefore, the power split mode is achieved.

At this time, the power of the second motor/generator MG2 is transmitted to the rear wheel reduction gear unit RCGU as auxiliary power. The power transmitted to the rear wheel reduction gear unit RCGU is divided through the rear wheel differential apparatus RDIFF according to the road state and the running state, and the divided power is transmitted to the left and right rear wheels through the rear wheel drive shaft RDS The four wheel drive power transmission system of a hybrid electric vehicle according to the exemplary embodiment of the present invention uses the motor/generators less by one than the transmission system according to the related art, thereby reducing the production cost and minimizing a size of the power transmission system.

Further, it is possible to maximize the improvement of fuel efficiency by performing the driving of the power split mode having the better low-speed driving efficiency and the parallel mode and the continuous mode having the better high-speed driving efficiency.

For convenience in explanation and accurate definition in the appended claims, the terms "upper", "lower", "inner"

and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof It is intended that the scope of the invention be defined by the Claims appended hereto and their equivalents.

What is claimed is:

1. A four wheel drive power transmission system of a hybrid electric vehicle, comprising:
    a first input shaft directly and operably connected to an engine;
    a second input shaft disposed coaxially with the first input shaft;
    a first motor/generator operable as a first motor or a first generator and directly and operably connected to the second input shaft;
    a second motor/generator operable as a second motor or a second generator and disposed in a rear wheel side transmission housing;
    a planetary gear set disposed between the first and second input shafts, and including a first rotation element directly connected to the second input shaft, a second rotation element directly connected to the first input shaft, and a third rotation element selectively connected to the first input shaft;
    a power delivery unit including a first front wheel output gear selectively connected to the second input shaft and a second front wheel output gear selectively connected to the third rotation element of the planetary gear set, and selectively receiving power of the engine or power of the first motor/generator;
    a front wheel reduction gear unit changing power of the power delivery unit and transmitting the changed power to a front wheel differential apparatus; and
    a rear wheel reduction gear unit changing power of the second motor/generator and transmitting the changed power to a rear wheel differential apparatus.

2. The four wheel drive power transmission system of claim 1, wherein the planetary gear set is a single pinion planetary gear set and includes a sun gear being the first rotation element, a planet carrier being the second rotation element, and a ring gear being the third rotation element.

3. The four wheel drive power transmission system of claim 1, further comprising:
    a first clutch disposed between the second input shaft and the first front wheel output gear;
    a second clutch disposed between the first input shaft and the third rotation element of the planetary gear set; and
    a third clutch disposed between the third rotation element of the planetary gear set and the second front wheel output gear.

4. The four wheel drive power transmission system of claim 1, wherein the front wheel reduction gear unit comprises:
    a front wheel intermediate shaft disposed in parallel with the first and second input shafts;
    a first front wheel intermediate gear fixedly disposed on the front wheel intermediate shaft and engaged with the first front wheel output gear;
    a second front wheel intermediate gear fixedly disposed on the front wheel intermediate shaft and engaged with the second front wheel output gear; and
    a front wheel final output gear fixedly disposed on the front wheel intermediate shaft and engaged with a front wheel final reduction gear of the front wheel differential apparatus to transmit power of the front wheel intermediate shaft to the front wheel differential apparatus.

5. The four wheel drive power transmission system of claim 1, wherein the rear wheel reduction gear unit comprises:
    a rotor shaft directly and operably connected to the second motor/generator; and
    a rear wheel output gear fixedly disposed on the rotor shaft and engaged with a rear wheel final reduction gear of the rear wheel differential apparatus to transmit power of the rotor shaft to the rear wheel differential apparatus.

6. A four wheel drive power transmission system of a hybrid electric vehicle, comprising:
    a first input shaft directly and operably connected to an engine;
    a second input shaft disposed coaxially with the first input shaft;
    a first motor/generator operable as a first motor or a first generator and directly and operably connected to the second input shaft;
    a second motor/generator operable as a second motor or a second generator and disposed in a rear wheel side transmission housing;
    a planetary gear set disposed between the first and second input shafts and including a sun gear directly connected to the second input shaft, a planet carrier directly connected to the first input shaft, and a ring gear selectively connected to the first input shaft;
    a power delivery unit including a first front wheel output gear selectively connected to the second input shaft and a second front wheel output gear selectively connected to the ring gear of the planetary gear set, and selectively receiving power of the engine or power of the first motor/generator;
    a front wheel reduction gear unit changing power of the power delivery unit and transmitting the changed power to a front wheel differential apparatus; and
    a rear wheel reduction gear unit changing power of the second motor/generator and transmitting the changed power to a rear wheel differential apparatus.

7. The four wheel drive power transmission system of claim 6, further comprising:
    a first clutch disposed between the second input shaft and the first front wheel output gear;
    a second clutch disposed between the first input shaft and the ring gear of the planetary gear set; and
    a third clutch disposed between the ring gear of the planetary gear set and the second front wheel output gear.

8. The four wheel drive power transmission system of claim 6, wherein the front wheel reduction gear unit comprises:
    a front wheel intermediate shaft disposed in parallel with the first and second input shafts;

a first front wheel intermediate gear fixedly disposed on the front wheel intermediate shaft and engaged with the first front wheel output gear;

a second front wheel intermediate gear fixedly disposed on the front wheel intermediate shaft and engaged with the second front wheel output gear; and a front wheel final output gear fixedly disposed on the front wheel intermediate shaft and engaged with a front wheel final reduction gear of the front wheel differential apparatus to transmit power of the front wheel intermediate shaft to the front wheel differential apparatus.

9. The four wheel drive power transmission system of claim 6, wherein the rear wheel reduction gear unit comprises:

a rotor shaft directly and operably connected to the second motor/generator; and a rear wheel output gear fixedly disposed on the rotor shaft and engaged with a rear wheel final reduction gear of the rear wheel differential apparatus to transmit power of the rotor shaft to the rear wheel differential apparatus.

10. A four wheel drive power transmission system of a hybrid electric vehicle, comprising:

a front wheel drive unit configured to selectively transmit power of an engine and power of a first motor/generator to a front wheel differential apparatus; and a rear wheel drive unit configured to transmit power of a second motor/generator to a rear wheel differential apparatus, wherein the front wheel drive unit includes a planetary gear set disposed between the engine and the first motor/generator, and a front wheel reduction gear unit selectively receiving the power of the engine or the power of the first motor/generator, the planetary gear set includes a first rotation element directly connected to the first motor/generator, a second rotation element directly connected to the engine, and a third rotation element selectively connected to the engine, and the front wheel reduction gear unit is selectively connected to the first rotation element or the third rotation element.

11. The four wheel drive power transmission system of claim 10, wherein the front wheel reduction gear unit includes a front wheel intermediate shaft and first and second front wheel intermediate gears and a front wheel final output gear fixedly disposed on the front wheel intermediate shaft, and the first front wheel intermediate gear is selectively connected to the first rotation element, the second front wheel intermediate gear is selectively connected to the third rotation element, and the front wheel final output gear is operably connected to the front wheel differential apparatus.

12. The four wheel drive power transmission system of claim 11, further comprising:

a first front wheel output gear engaged with the first front wheel intermediate gear;

a second front wheel output gear engaged with the second front wheel intermediate gear;

a first clutch selectively connecting the first rotation element with the first front wheel output gear;

a second clutch selectively connecting the second rotation element with the third rotation element; and a third clutch selectively connecting the third rotation element with the second front wheel output gear.

13. The four wheel drive power transmission system of claim 10, wherein the rear wheel drive unit includes a rear wheel reduction gear unit which changes the power of the second motor/generator and transmits the changed power to the rear wheel differential apparatus.

14. The four wheel drive power transmission system of claim 13, wherein the rear wheel reduction gear unit comprises:

a rotor shaft directly and operably connected to the second motor/generator; and a rear wheel output gear fixedly disposed on the rotor shaft and engaged with a rear wheel final reduction gear of the rear wheel differential apparatus to transmit power of the rotor shaft to the rear wheel differential apparatus.

* * * * *